United States Patent [19]

Hayashi et al.

[11] Patent Number: 5,686,959
[45] Date of Patent: Nov. 11, 1997

[54] IMAGE QUALITY INSPECTION SYSTEM AND IMAGE SYNTHESIS METHOD

[75] Inventors: Masaki Hayashi, Hanyu; Hiroto Satoh; Teruhiko Nagashima, both of Kohnosu; Hiroyuki Aoki, Gyoda, all of Japan

[73] Assignee: Advantest Corporation, Tokyo, Japan

[21] Appl. No.: 515,373

[22] Filed: Aug. 15, 1995

[30] Foreign Application Priority Data

Aug. 19, 1994 [JP] Japan .................................. 6-218116

[51] Int. Cl.$^6$ ...................................................... H04N 7/18
[52] U.S. Cl. ............................ 348/126; 324/770; 382/149
[58] Field of Search ........................... 348/86, 87, 88, 348/92, 93, 94, 95, 125, 126, 128, 129, 130; 324/770; 382/149, 151, 147, 145, 144, 148

[56] References Cited

U.S. PATENT DOCUMENTS

| | | | |
|---|---|---|---|
| 3,899,634 | 8/1975 | Montone et al. | 348/95 |
| 5,293,178 | 3/1994 | Kobayashi | 348/92 |
| 5,339,093 | 8/1994 | Kumagai et al. | 324/770 |
| 5,504,438 | 4/1996 | Henley | 324/770 |

*Primary Examiner*—Amelia Au
*Attorney, Agent, or Firm*—Knobbe, Martens, Olson & Bear, LLP

[57] ABSTRACT

An image quality inspection system to test a display panel with high resolution and low cost by forming a synthesized contrast image of the display panel is disclosed. The image quality inspection system includes a camera section with a built-in image element to capture the image contrast data of the display panel, a rotating plate holding optical filters, an optical lens section having a focal adjustment mechanism for forming an image on the camera section, two parallel plates to move the image by thickness and rotating tilt angles of the plates, a plurality of motors to drive the parallel plates and the parallel plates, an A/D conversion section that converts the image contrast data output from the camera section to digital signals, an image memory that stores the contrast data converted to the digital signal, an image synthesis memory that performs an image fitting process in accordance with image motion controls by the parallel plates and produces a single image of the display panel, and a CPU control section that controls an image synthesis process in the image synthesis memory.

2 Claims, 9 Drawing Sheets

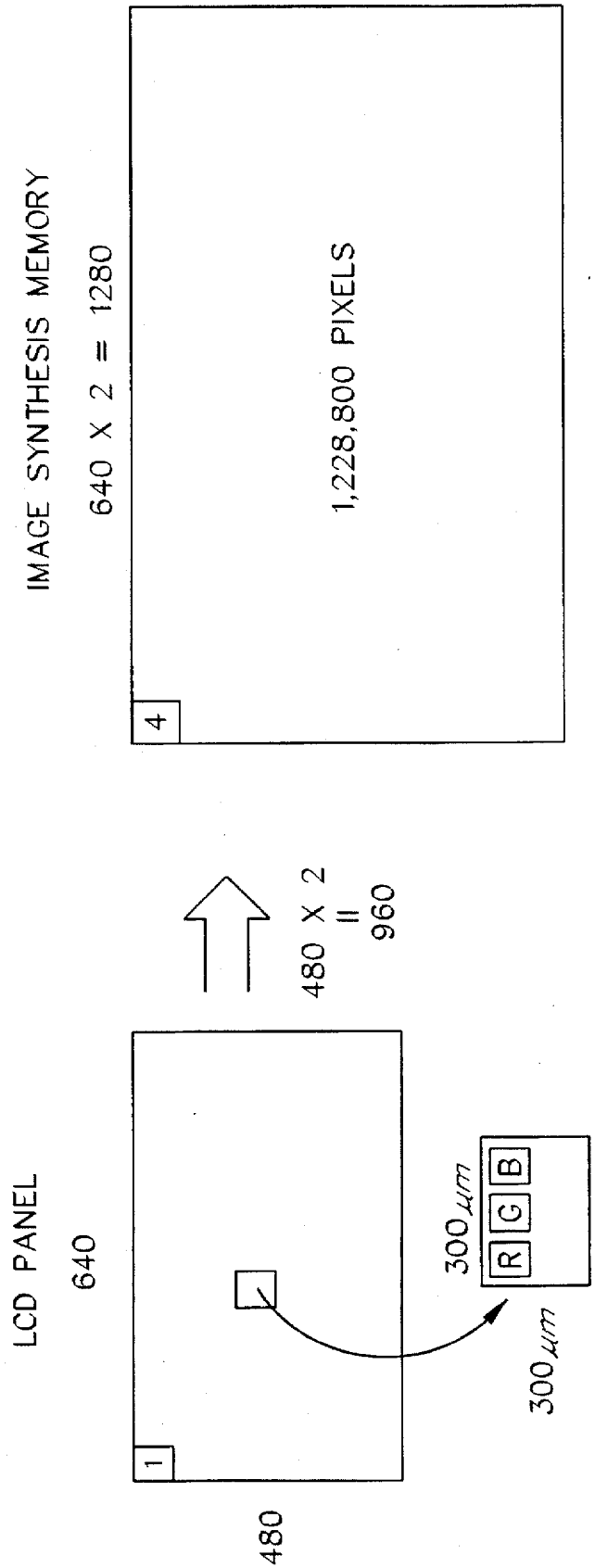

| 1  | 1a | 1b | 2  | 2a | 2b |
|----|----|----|----|----|----|
| 1g | 1h | 1c | 2g | 2h | 2c |
| 1f | 1e | 1d | 2f | 2e | 2d |
| 3  | 3a | 3b | 4  | 4a | 4b |
| 3g | 3h | 3c | 4g | 4h | 4c |
| 3f | 3e | 3d | 4f | 4e | 4d |

FIG. 7

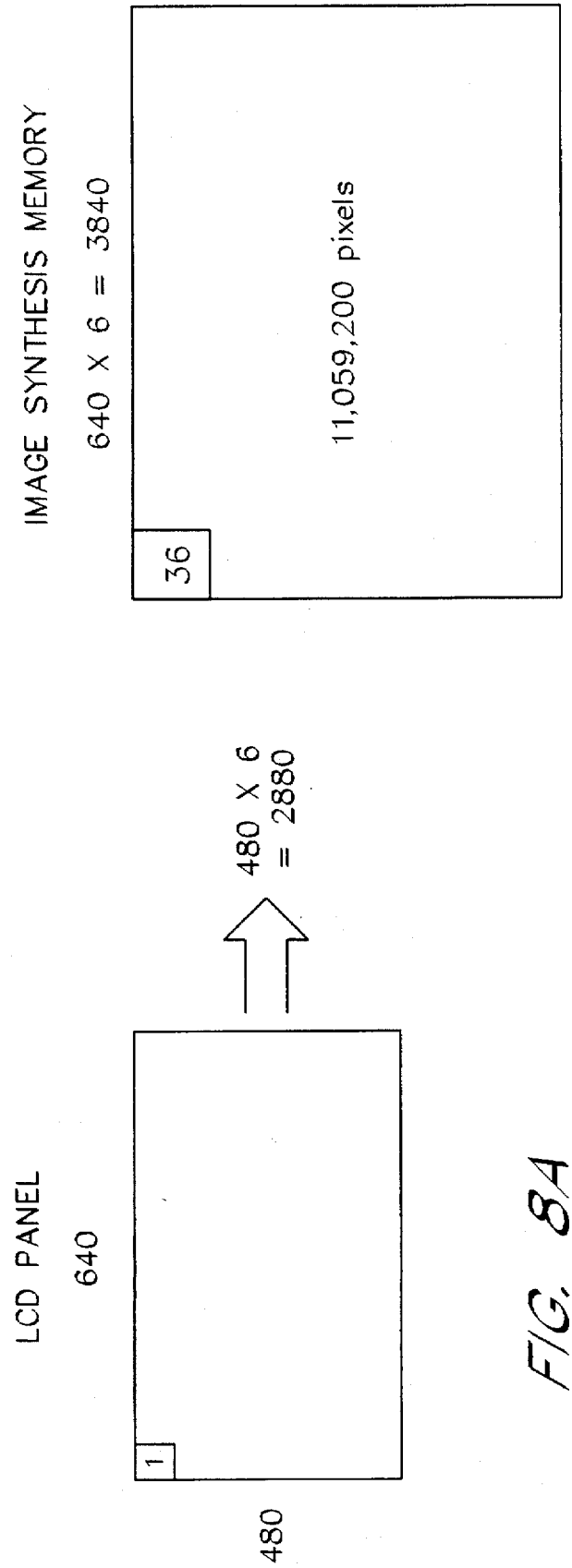

| 1 | 1a | 1b | 2 | 2a | 2b |
|---|----|----|---|----|----|
| 3 | 3a | 3b | 4 | 4a | 4b |

*FIG. 9A*

| 1  | 2  |
|----|----|
| 1a | 2a |
| 1b | 2b |
| 3  | 4  |
| 3a | 4a |
| 3b | 4b |

*FIG. 9B*

IMAGE QUALITY INSPECTION SYSTEM AND IMAGE SYNTHESIS METHOD

FIELD OF THE INVENTION

This invention relates to an image quality inspection system and an image synthesis method for obtaining high resolution images of display panel with low cost.

BACKGROUND OF THE INVENTION

When measuring the contrast of pixels of an object to be inspected using a CCD (Charge Coupled Device) camera in the image inspection of a flat panel display, such as a LCD (Liquid Crystal Display) panel, being able to take in the contrast of pixels of a LCD panel to be inspected with the small number of CCD pixels is the prerequisite for inexpensive, accurate and suitable inspection system used in the production line.

Traditionally, in order to create an image by measuring the contrast of a LCD panel having a pixel size of 300 µm², for example, by a CCD camera, many CCD pixels are required to correspond to a single LCD pixel for specifying a position of the LCD pixel. For example, 36 CCD pixels have been corresponded to a single LCD pixel.

In the method utilizing many CCD pixels corresponding to a single LCD pixel, it is required to increase the density of CCD pixels, which makes the CCD expensive.

SUMMARY OF THE INVENTION

Therefore, an objective of this invention is to provide an image quality inspection system which is able to measure the contrast of a LCD panel accurately and in high resolution with a small number of CCD pixels when measuring the LCD panel using a CCD camera.

In order to achieve this objective, in this invention, a camera section with a built-in image element such as CCD is arranged to capture the image contrast data of a display panel to be inspected such as a LCD panel. For a color image, four optical filters of red, green, blue and transparency are installed on a rotating plate in order to measure the brightness of red, green and blue separately or the brightness of white. In addition, an optical lens section having a focal adjustment mechanism for forming an image on the camera section is arranged. A plane parallel plate for the X direction and a plane parallel plate for the Y direction are arranged to allow the image to be moved by the glass thickness and rotating tilt angle. The above rotating plate, the plane parallel plate for the X direction and the plane parallel plate for the Y direction are driven by corresponding motors, each motor of which is controlled by a motor control section. The image contrast data output from the camera section is converted to digital signals by an A/D conversion section and stored temporarily in an image memory. The image contrast data obtained by image motion control in the X and Y directions using the plane parallel plates is processed for image fitting corresponding to the movements and stored in an image synthesis memory as a single image of the image element. The image synthesis control and motor control are performed, then, the image synthesis data is processed and the detection of image defects are carried out in a CPU control section.

The image synthesis of the present invention is performed as follows. Firstly, the image of a panel to be inspected without the movement in the X and Y directions by the plane parallel plates is taken in by the image element and stored in the image memory, and further stored in the image synthesis memory. Next, the image of the display panel is moved by controlling the rotating tilt angle of the plane parallel plates and the resulted image contrast data of the panel to be inspected is stored in the image memory, and further processed to fit in the position corresponding to the movement of the image in the synthesis memory. For example, when the image is moved in the X direction, the image data is stored at the memory location corresponding to the movement in the X direction in contrast with the image data with no movement. A single image of the image element is obtained by performing the image fitting process on the image synthesis memory by the image movement controlled by the rotating tilt angle of the plane parallel plates, storing the moved image in the image memory, and further repeating the fitting process of the image synthesis memory to the position corresponding to the movement. As a result, high resolution measurements with the smaller number of pixels of the image element are possible in contrast with the number of pixels of the panel to be inspected.

The image inspection system as composed above can increase the measuring resolution without increasing the number of pixels of the image element in contrast with the number of pixels of the display panel to be inspected, hence, it makes the highly accurate measurements possible with low cost.

BRIEF DESCRIPTION OF THE DRAWINGS

FIG. 3($a$) and 3($b$) is a schematic diagram showing a relationship between the LCD panel and the image synthesis memory B when the image is not shifted.

FIG. 7 is a schematic diagram for measuring the LCD panel with resolution of 36 CCD pixels per one LCD pixel by the image shift.

FIG. 8($a$) and 8($b$) is a schematic diagram showing the relationship between the LCD panel and the image synthesis memory B when measuring the LCD panel with the resolution of 36 CCD pixels/one LCD pixel by the image shift.

FIG. 9($a$) and 9($b$) is a schematic diagram where the CCD pixels are shifted in the X and Y directions by the image shift process of the present invention.

DETAILED DESCRIPTION OF THE PREFERRED EMBODIMENT

Figure 1:
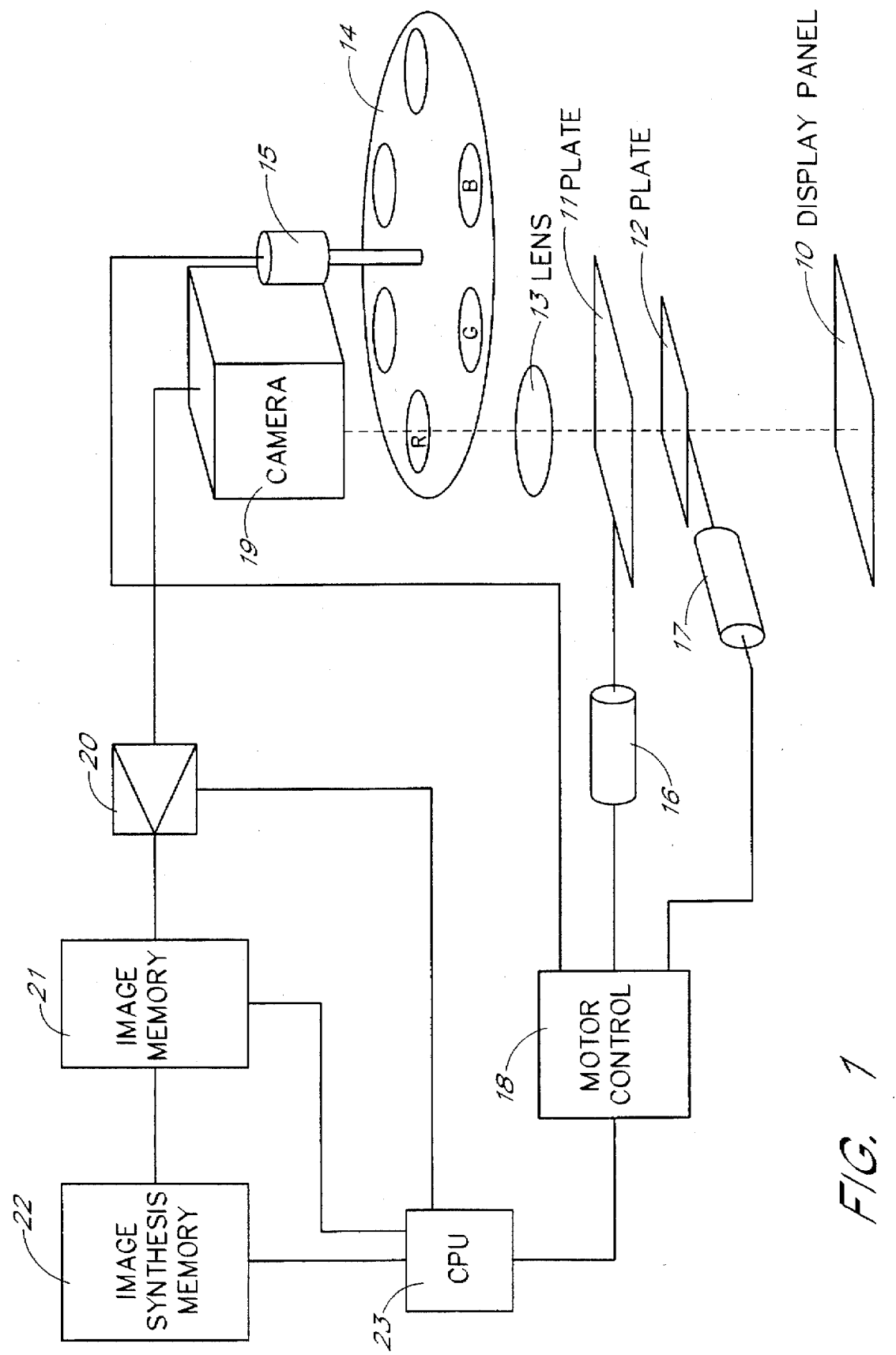
FIG. 1 is a schematic diagram showing the structure of the image quality inspection system of the present invention.

FIG. 1 is a diagram showing the basic structure of the image quality inspection system in accordance with the present invention. This image inspection system comprises: an image element, for example a camera section 19 with a built-in CCD for capturing an image contrast data of a display panel 10 to be inspected; a rotating plate 14 to capture an image through 4 optical filters of R (Red), G (Green), B (Blue), and transparency which are attached to the rotating plate; an optical lens section 13 having a focal adjustment mechanism for forming an image on the camera section 19; a plane parallel plate for the X direction 11 and plane parallel plate for the Y direction 12 which allow the image to be moved by the glass thickness and rotating tilt angle within an approximate stroke of 400 µm with an accuracy of several µm; a motor 15 for rotating the rotating plate 14, a motor 16 for rotating the plane parallel plate 11 for the X direction and a motor 17 for rotating the plane parallel plate 12 for the Y direction; a motor control section 18 that controls each of the motors 15–17; an A/D conversion section 20 that converts the image contrast data output from the camera section 19 to digital signals; an image memory 21 to temporarily store the contrast data from the A/D conversion section 20; an image synthesis memory 22 that performs the image fitting process in accordance with the image motion control in the X and Y directions by the plane parallel plates to form a single CCD image; a CPU control section 23 that performs the image synthesis control and motor control, processes the image synthesis data and carries out the detection of image defects.

Note that an aperture function can be added to the optical lens section 13 to optimize the image formed on the camera section 19.

Figure 2:
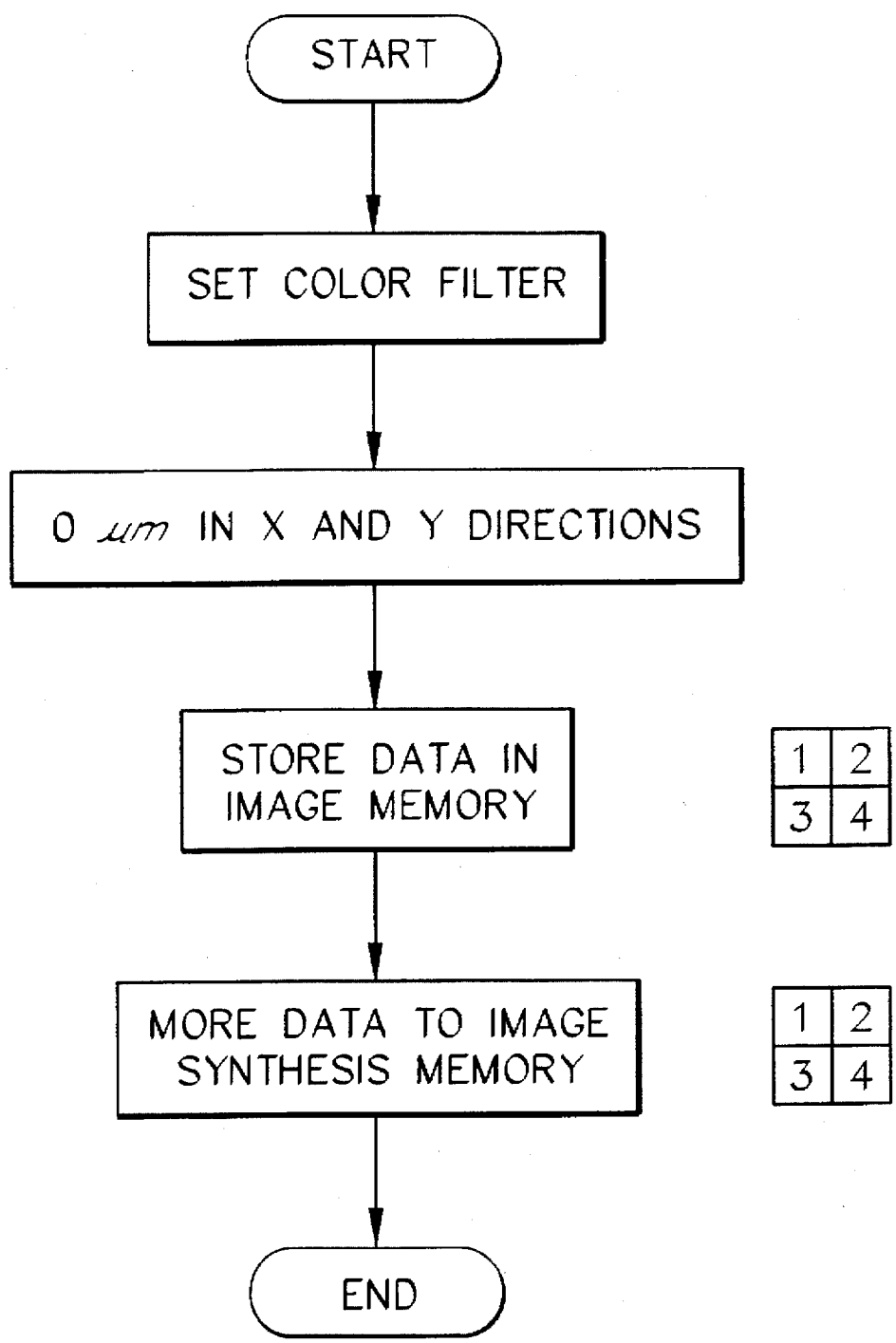
FIG. 2 is a flowchart of the control process for capturing an image when the image is not shifted.

FIG. 2 shows a flowchart of control process when the image shift is not performed by the plane parallel plates. In this case, 4 CCD pixels are assigned for a single LCD pixel. Hence, a LCD panel with 640×480 pixels can be taken into a CCD camera with 1280×960 pixels.

Figure 4A:
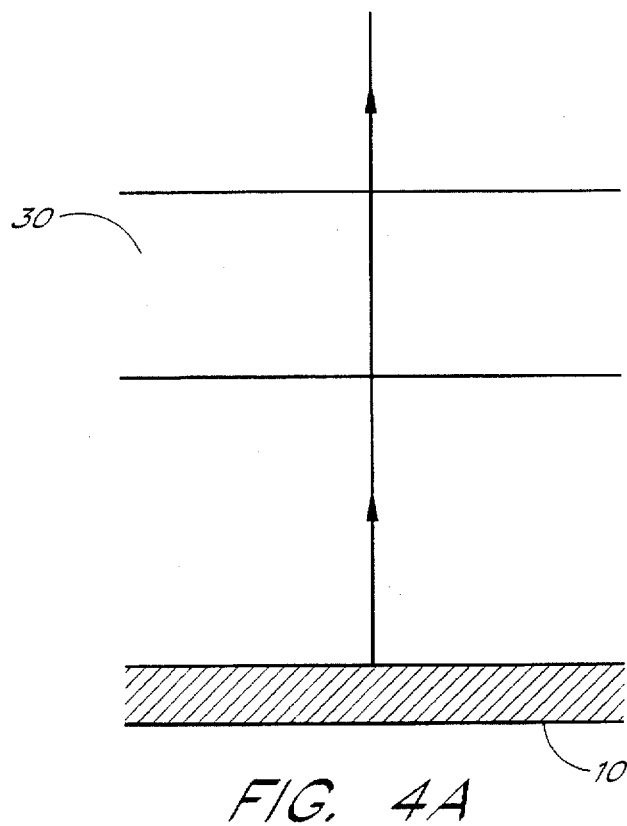
FIG. 4($a$) and 4($b$) is a schematic diagram showing the image movement by the plane parallel glass plates.
Figure 4B:
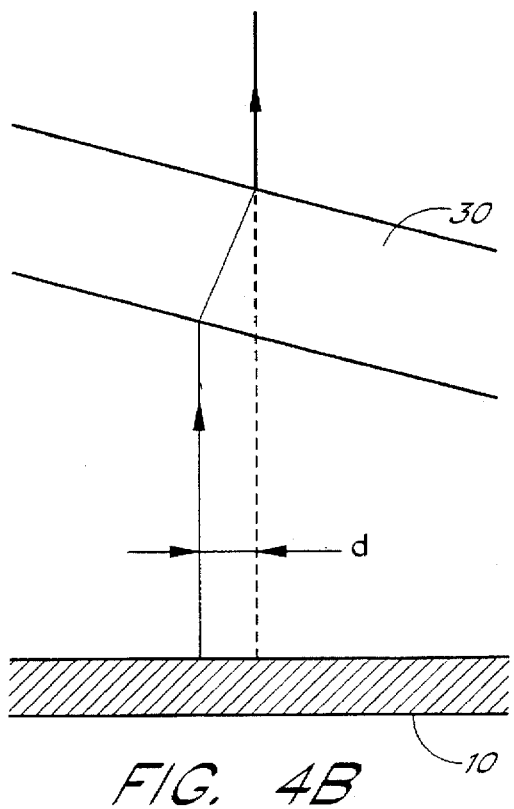

FIG. 4 shows the principle of a tilt and thickness of the plane parallel glass with both sides of the faces polished in flat and parallel to each other when a glass is used as the plane parallel plates 11 and 12, and the principle of the image shift of the panel to be inspected. When the plane parallel glass 30 is in parallel with the display panel 10 to be tested as shown in FIG. 4(a), the image on the panel 10 advances straight into the plane parallel glass 30. Whereas when the plane parallel glass 30 is tilted as shown in FIG. 4(b), the image on the panel is taken in with the shifted distance d due to refraction of the glass.

Figure 5:
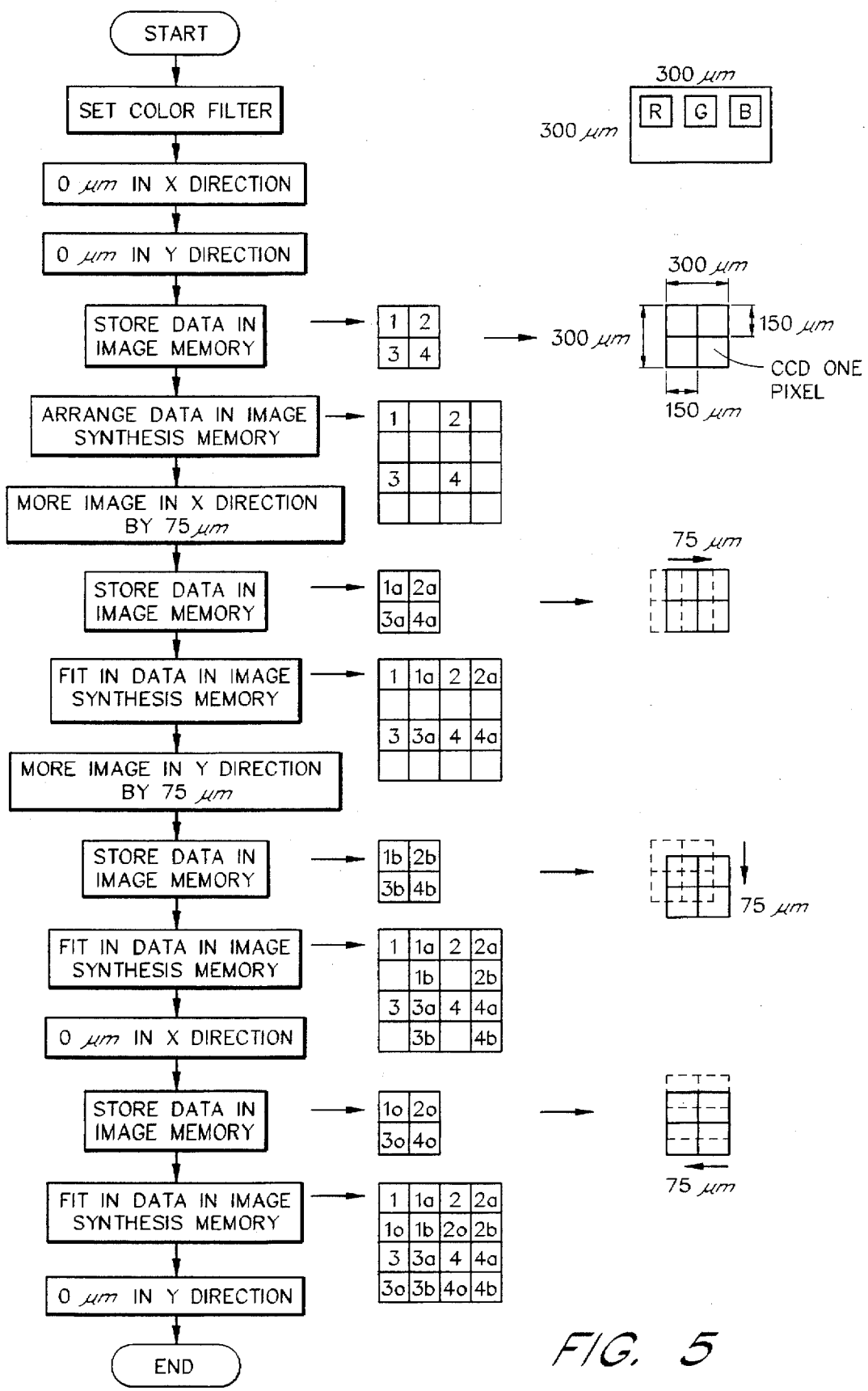
FIG. 5 is a flowchart of the control process for capturing an image when measuring the LCD panel with resolution of 16 CCD pixels per one LCD pixel by the image shift.
Figure 6B:
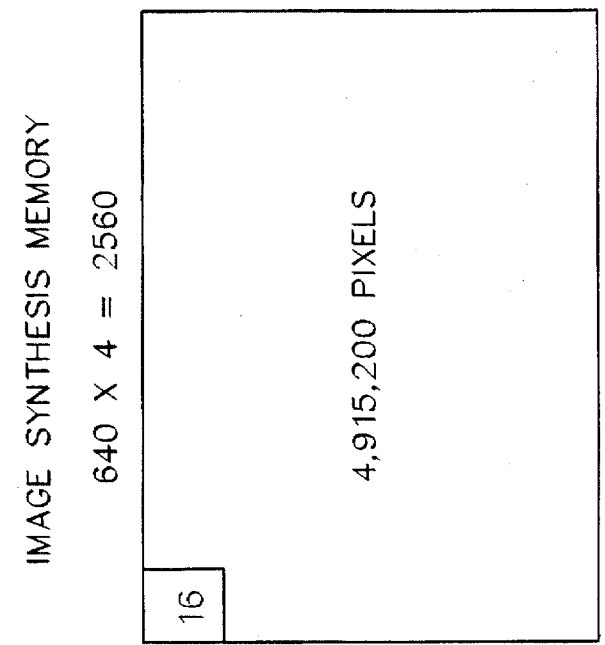
FIG. 6($a$) and 6($b$) is a schematic diagram showing the relationship between the LCD panel and image synthesis memory B when measuring with the resolution of 16 CCD pixels per one LCD pixel by the image shift.
Figure 6A:
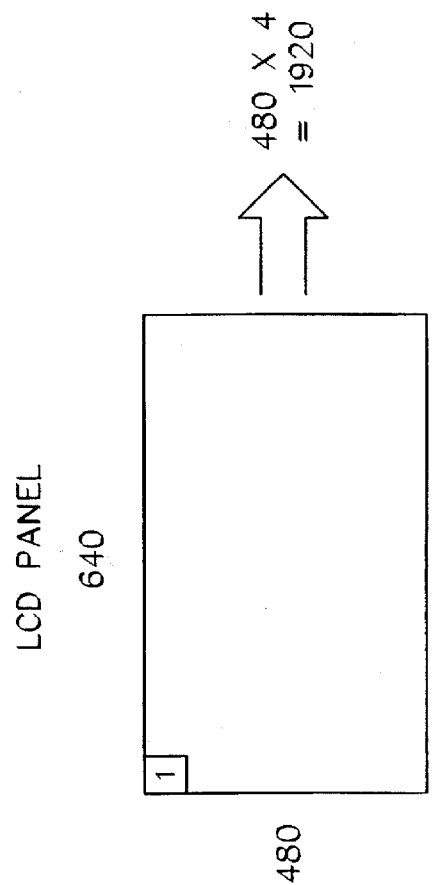

FIG. 5 illustrates a flowchart of the control for capturing an image when the single LCD pixel is 300 µm square, four CCD pixels are used for a single LCD pixel and the image shifts by the plane parallel plates 11 and 12 are set to 75 µm in the X and Y directions. In this case, the image taken in with 4×4=16 pixels/one LCD pixel is obtained in the image synthesis memory 22 and data equivalent to 16 CCD pixel resolution per one LCD pixel can be obtained. Overall, LCD with 640×480 pixels can be taken in as data equivalent to CCD with 2560×1920 pixels in the image synthesis memory 22 as shown in FIG. 6.

FIG. 7 illustrates a flowchart of the control for capturing an image when the single LCD pixel is 300 µm square, 4 CCD pixels are used for a single LCD pixel and the image shifts by the plane parallel plates 11 and 12 are set to 50 µm and 100 µm in the X and Y directions, respectively. In this case, the image taken in with 6×6=36 pixels per one LCD pixel is obtained in the image synthesis memory 22 and data equivalent to 36 CCD pixel resolution per one LCD pixel can be obtained. Overall, LCD with 640×480 pixels can be taken in as data equivalent to CCD with 3840×2880 pixels in the image synthesis memory 22 as shown in FIG. 8.

As the LCD image can be arbitrarily shifted in the X and Y directions by the plane parallel plates 11 and 12, data can be obtained by shifting 50 µm and 100 µm only in the X direction as shown in FIG. 9(a) or data can be obtained by shifting 50 µm and 100 µm only in the Y direction as shown in FIG. 9(b).

From the foregoing, the direction of the movement and the moving distance can be selected depending on the kind of defects of the object to be inspected because the movement of the LCD image by the plane parallel plate can be set by a program.

Note that the above description was made in detail with a LCD panel as a panel to be inspected and CCD as an image element, but this invention is not limited by these cases. It extends to a flat panel in general such as an EL (Electro-Luminescence) panel and plasma display panel, and further MOS (Metal Oxide Semiconductor) type sensors as an image element.

As this invention is composed as explained above, the resolution can be increased without increasing the number of pixels of the image element with respect to the number of pixels of the panel to be inspected. In addition, it can obtain low cost and high resolution images as the pixel density of the image element can be reduced.

We claim:

1. An image quality inspection system that can obtain high resolution images, comprising:

a camera section (19) with a built-in image element to capture image contrast data of a display panel (10) to be inspected;

a rotating plate (14) holding optical filters in order to capture the image contrast data through optical filters;

an optical lens section (13) having a focal adjustment mechanism for forming an image on the camera section (19);

two plane parallel plates (11, 12) for a X direction and a Y direction which allow an image of the display plate to be moved based on thickness and rotating tilt angles of the plane parallel plates (11, 12);

a plurality of motors (15, 16, 17) that rotate the rotating plate (14), the plane parallel plates (11, 12) for the X and Y directions;

a motor control section (18) that controls the plurality of motors (15, 16, 17);

an A/D conversion section (20) that converts the image contrast data output from the camera section (19) to digital signals;

an image memory (21) that stores the contrast data converted to the digital signal;

an image synthesis memory (22) that performs an image fitting process in accordance with image motion controls in the X and Y directions by the plane parallel plates and produces a single image of the image element;

a CPU control section (23) that controls an image synthesis process in the image synthesis memory and processes the image synthesis data and detects image defects in the display panel.

2. A method for synthesizing a contrast image of a display panel to obtain high resolution images with smaller number of pixels, the method comprising:

taking image data of a display panel to be inspected by an image element formed with the pixels and provided inside of a camera section;

storing the image data taken by the camera section in an image memory, and then further storing the image data in an image synthesis memory;

shifting the image data of the display panel under test by controlling rotating tilt angles of plane parallel plates;

storing the image data obtained by shifting the plane parallel plates in the image memory and further fitting the shifted data in a position corresponding to an amount of the shifted image data in the image synthesis memory; and forming a single image of the display panel by repeating the above steps in the image synthesis memory for all area of the display panel.

* * * * *